United States Patent [19]
Smock

[11] 3,784,255
[45] Jan. 8, 1974

[54] AIR-BAG ELEVATED DUMP VEHICLE

[76] Inventor: Edmund G. Smock, 1502 August St., Zanesville, Ohio 43701

[22] Filed: Sept. 11, 1972

[21] Appl. No.: 287,764

Related U.S. Application Data

[63] Continuation-in-part of Ser. No. 148,783, June 1, 1971, Pat. No. 3,711,157.

[52] U.S. Cl. ................... 298/8 T, 92/92, 298/22 R
[51] Int. Cl. ............................................. B60p 1/16
[58] Field of Search ................... 298/22 R, 8, 1 A; 92/89, 90, 91, 92

[56] References Cited
UNITED STATES PATENTS
3,659,899   5/1972   Phillips ........................... 298/1 A FOREIGN PATENTS OR APPLICATIONS
161,243   7/1964   U.S.S.R. ............................ 298/22 R
930,163   7/1963   Great Britain .................... 298/22 R
455,000   2/1950   Italy ................................. 298/8 R Primary Examiner—Richard J. Johnson
Attorney—Mahoney, Miller & Stebens

[57] ABSTRACT

A dump vehicle comprising a dump body pivotally mounted on the vehicle chassis frame for movement between a horizontal normal position and an inclined dumping position using an air bag or air bellows assembly as a means of power to raise and lower the dump body. The dump body is so pivoted and the air bellows is so disposed between the body and the chassis frame that maximum lift is obtained with a minimum stroke of the air-bag assembly. The air-bag assembly consists of two or more air bags stacked in end-to-end relationship to obtain maximum lift. A stabilizer plate is disposed between the adjacent ends of the two bags and is hinged at the pivot point of the dump body so as to prevent undue lateral displacement of the bag assembly as the bags are expanded into an arcuate body with its axis concentric with the hinged or dump axis.

8 Claims, 5 Drawing Figures

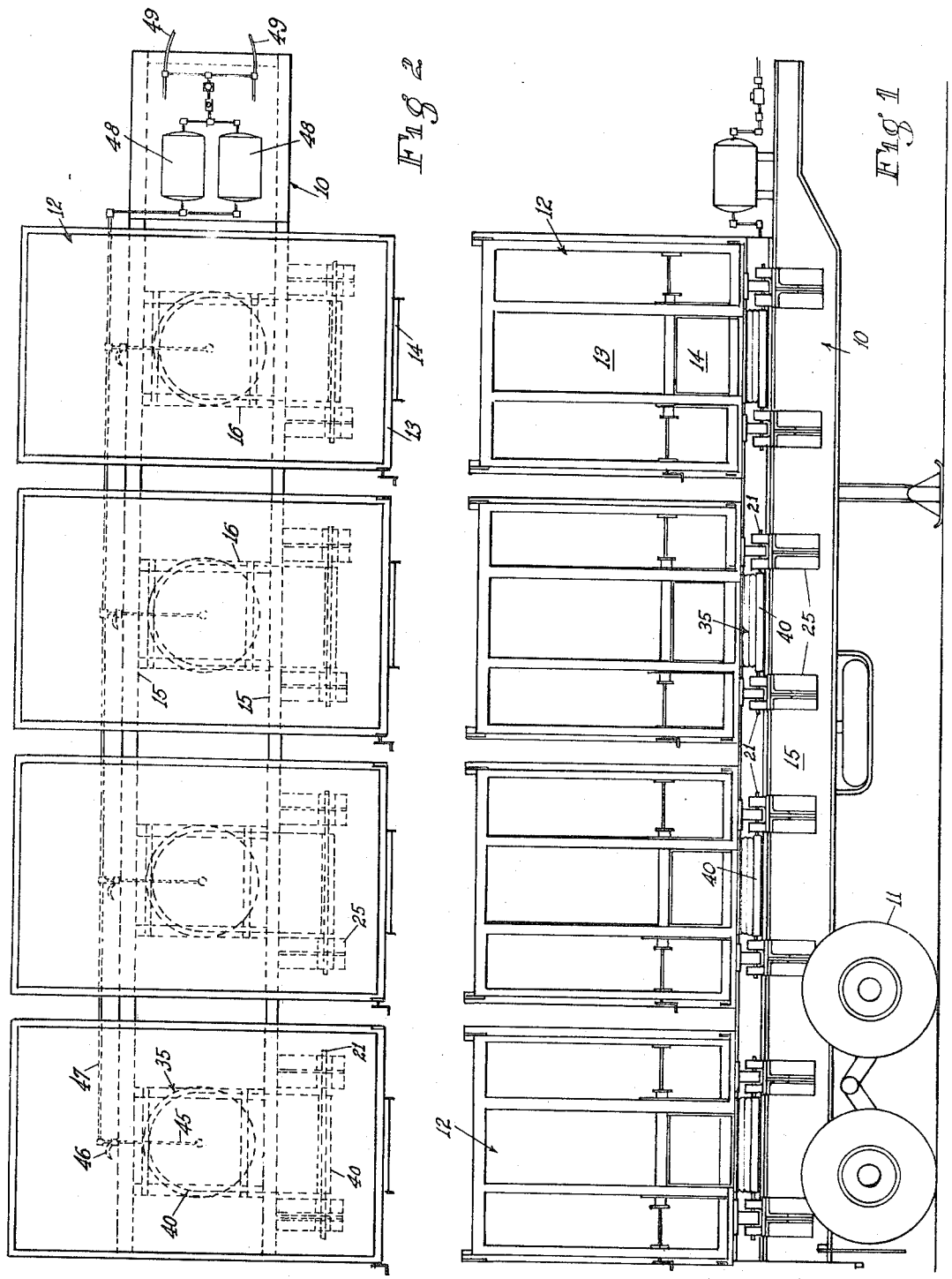

AIR-BAG ELEVATED DUMP VEHICLE

This application is a continuation-in-part of my copending application, Ser. No. 148,783, filed June 1, 1971, now U.S. Pat. No. 3,711,157, dated Jan. 16, 1973.

The dump body of my invention may be mounted on a truck chassis or a trailer chassis. It can be mounted as a single body on a vehicle chassis or, as disclosed herein, as multiple bodies disposed transversely on a long trailer chassis and being pivoted for dumping individually but all to the same side of the trailer. The pivot or hinge structure of the body to the vehicle chassis frame is such that a minimum lift will dump the body. The lifting means according to the present invention is in the form of an air bag or air bellows assembly which is connected between the chassis frame and the dump body and is so related to the pivot for the dump body that a short stroke of the bag assembly will produce a substantial lift of the body to dumping position.

The air bag assembly consists of two or more air bags of usual construction which are superimposed in end-to-end relationship with their axes in alignment in a vertical position before expansion or extension. Between the adjacent ends of the bags, is a hinged stabilizer plate to the opposite faces of which the respective bag ends are fixed. This plate is hinged at the same axis as the dump body so that it will confine movement of the air bags, during expansion to lift the dump body, to an arcuate path so that the axis of the air bag assembly will be substantially arcuate and concentric with the hinge axis. The result is that maximum lift will be produced with minimum deterioration of the air bags.

The best mode contemplated in carrying out this invention is illustrated in the accompanying drawings in which:

FIG. 1 is a side elevational view of a trailer embodying my invention and including a plurality of the dump bodies pivotally mounted transversely of the chassis for selective elevation by the air-bag assembly elevating means to dump transversely at one side of the trailer.

FIG. 2 is a plan view of the trailer of FIG. 1.

Figure 3:
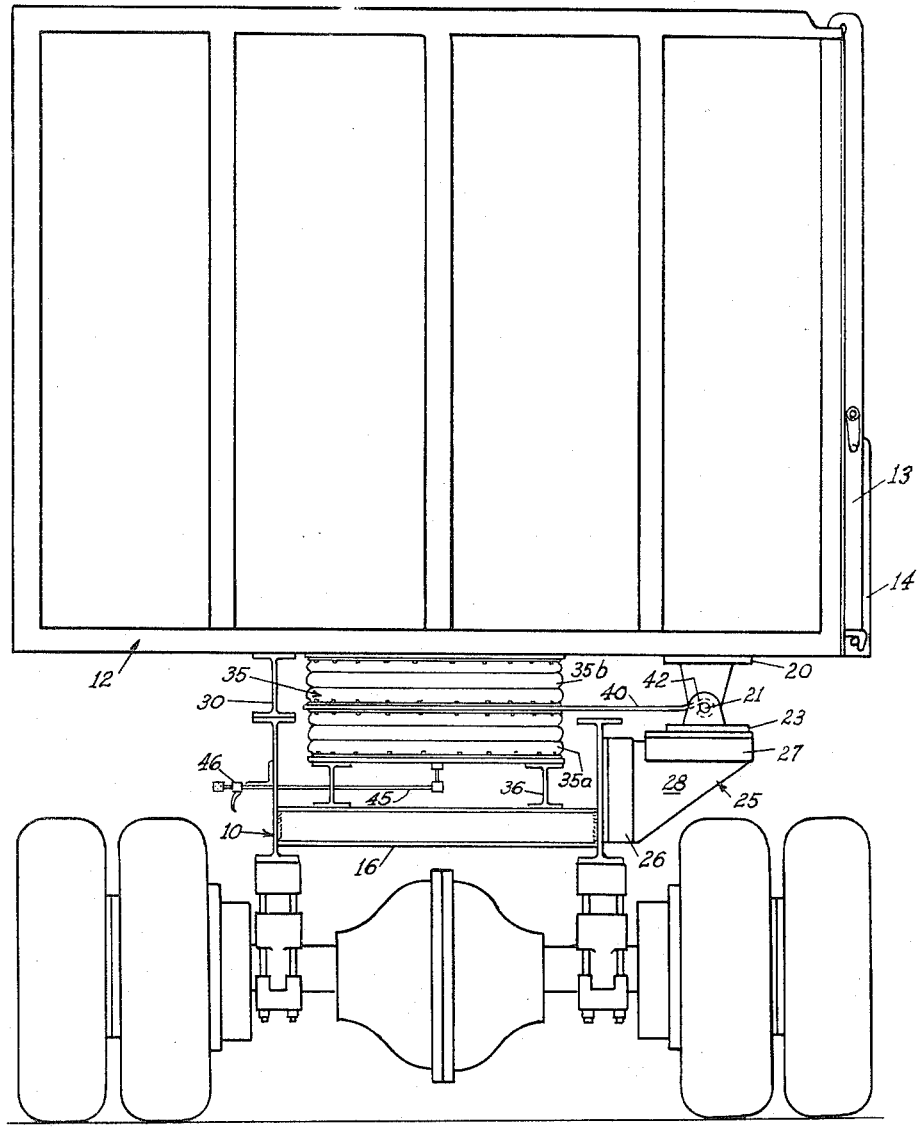
FIG. 3 is an enlarged rear view of the trailer showing the rearwardmost dump body and the air-bag assembly and pivot arrangement therefor, the body being in its normal lower position.

With particular reference to the drawings, in FIGS. 1 and 2, I have illustrated my invention incorporated in a trailer which includes a chassis that has a long frame 10 carried on the rear wheels 11. On the chassis frame extending transversely thereof are a plurality of dump bodies 12. Four of these bodies are shown but any suitable number may be provided. These bodies 12 may be of any suitable type and are all pivoted to the chassis frame 10 for dumping to the same side of the trailer. Each of the bodies 12 may have a pivoted tailgate 13 at the one side which is opened for dumping the entire contents at once when the gate is released. However, each gate 13 may be equipped with an auxiliary discharge chute structure 14, for controlled-flow dumping of the contents. This structure 14 may be of the type disclosed in my U.S. Pat. No. 3,361,476 issued Jan. 2, 1968.

Figure 4:
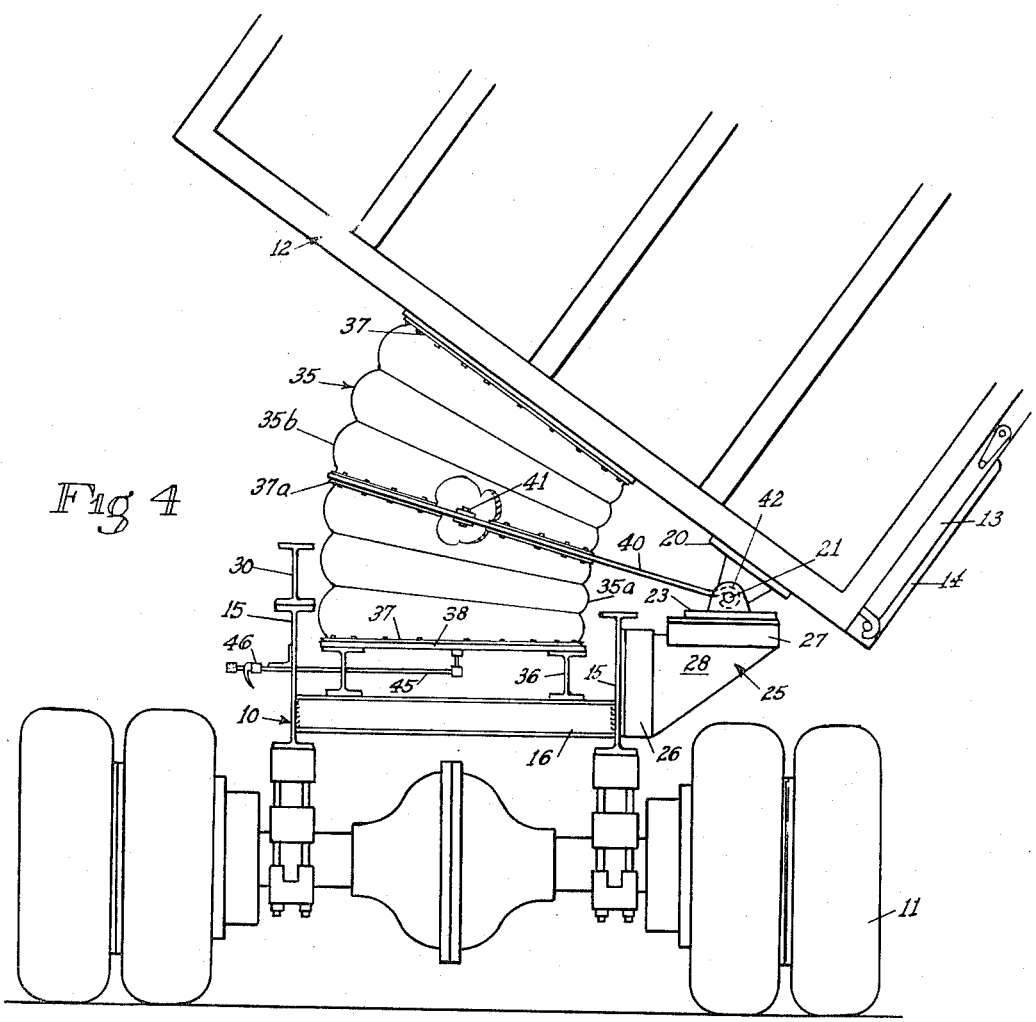
FIG. 4 is a similar view but showing the dump body in its raised position.

The chassis frame 10 may be constructed in the usual manner and is shown as consisting of a pair of longitudinally extending deep I-beams 15. These I-beams, as shown best in FIGS. 3 and 4, are rigidly joined together and maintained in parallel relationship by the short cross-beams 16 extending transversely between the beams 15 and having their opposed ends welded thereto. These cross-beams 16 are disposed at regular intervals longitudinally of the I-beams 15, parallel to each other, and disposed at right angles to the beams 15.

Figure 5:
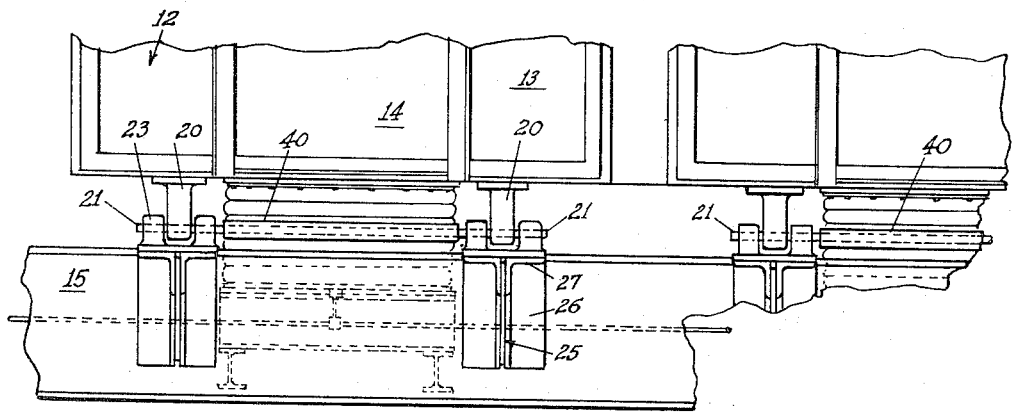
FIG. 5 is a detail in side elevation taken from the position indicated at line 5-5 of FIG. 3 to show further the pivot hinge and air-bag assembly for the dump body.

As indicated previously, each of the dump bodies 12 is pivoted for dumping to one side of the trailer and the pivoting is accomplished so that minimum lift is required to raise the body into dumping position. Obviously the dumping is toward that side of the trailer where the tailgates 13 are located. The pivot arrangement includes a depending pivot or hinge lug 20 of rugged construction which is connected to the bottom of the dump body 12 and is spaced inwardly of the tailgate end of the body 12, as shown best in FIGS. 3 and 4. Two of these hinge lugs 20 are provided for each body 12 and, as indicated in FIG. 5, the hinge structures are located adjacent the front and rear sides of the body but are spaced inwardly of the respective sides. Upstanding double hinge lugs 23 are provided for receiving each of the lugs 20 therebetween. Each of the double lugs 23 is upstanding from a rugged support which is carried by the beam 15 at the side where the dumping is to occur. This support is a bracket structure 25 which projects out from the beam 15, at a right angle thereto, and includes a triangular plate 28 which is disposed upright with its inner edge disposed within and welded to a pair of spaced angle strips 26 welded to the outer face of the beam 15 and its upper edge disposed within and welded to a pair of spaced angle strips 27. The double hinge lug 23 rests on and is welded to the strips 27. A transverse hinge rod 21 is provided for connecting both sets of hinge lugs 20-23 together, extending completely across the space between such sets. Opposite the dump-body hinge structure on the other beam 15 is an upstanding stop bracket 30 which will engage the bottom of the dump body 12 so that when the body moves to its lowermost or normal position, the bottom will be substantially level.

As indicated previously, according to this present invention an air bag assembly is used to control dumping of each of the bodies 12. These assemblies are designated by the reference character 35. Each assembly 35 consists of at least two air bags designated 35a and 35b which are of a type commonly manufactured and sold and usually consisting of a tubular shaped air container, having accordion-like folds, which is expansible and contractible axially by controlling the inlet and outlet of air under pressure. For example, the container may be made of neoprene-covered nylon cord. Each assembly 35 consists of the lower bag 35a and the upper bag 35b which, before expansion, have their axes in alignment and vertically disposed. Each assembly 35 is supported on the chassis frame 10 below the body 12, with its lower end secured to the frame and its upper end secured to the body by the respective clamping-ring units 37. The lower end of each lower bag 35a is supported by a plate 30 carried by a pair of longitudinally extending beam supports 36 which rest on the cross beams 16 and is attached to the plate by clamp 37. The upper end of each upper bag 35b is connected directly to the bottom of the respective dump body 12 by the clamp 37. With the body 12 in its lowermost position, the assembly 35 will be collapsed downwardly mainly into the space between the beams 15, as shown in FIG. 3. However, when the assembly 35 is expanded, it will be extended upwardly, as indicated in FIG. 4. This will cause the body 12 to pivot upwardly about the hinge axis 21 so as to dump the contents from the tailgate end. Because the pivot axis 21 is spaced inwardly from the tailgate end of the body 12 and the unit 35 is closely adjacent the pivot axis, a minimum stroke of the unit will result in a maximum elevation of the dump body 12 thereby facilitating discharge of its contents.

To confine flexing of the bags 35a and 35b of the assembly 35 to a predetermined arcuate path as the dump body 12 rises, a hinged restraining lever or stabilizer plate 40 is provided. This plate may be a flat steel plate, having a straight hinge end and a curved outer end concentric with the bags, and is disposed between the lower bag 35a and the upper bag 35b which are superimposed in end-to-end relationship. The upper end of the lower bag 35a is suitably attached to the lower face of the plate 40 and the lower end of the upper bag 35b is suitably attached to the upper face of the plate 40 by a double clamping ring unit 37a. A small tube or grommet 41 is inserted in an opening in the plate 40 to establish communication between the lower bag and the upper bag. The plate extends laterally outwardly from the bag assembly 35 and is provided with a curl 42 at its outer hinge edge which forms a sleeve to receive the hinge rod 21 that also extends through the sets of lugs 20–23. When air is supplied to the lower bag 35a, it is simultaneously supplied to the upper bag 35b, through the tube 41. Simultaneous expansion of the bags 35a and 35b will thus occur and since two bags are employed, the extent of lift of the dump body will be greater. The twisting or tilting of the superimposed bags also will not be as great, since two bags are employed, and will be confined to an arc, with its center at the axis of the hinge rod 21, by the connecting stabilizer plate or arm 40 hinged at that axis. Thus, maximum lift will be accomplished by the bag assembly with maximum twisting and distortion of the bags of the assembly which otherwise might produce excessive deterioration of the bags.

Any suitable pneumatic system may be provided for selective control of the various pneumatic bag assemblies. In the example shown, each assembly 35 has a line 45 connected to the lower end of the lower bag 35a. Each of these lines is controlled by a manual valve 46. All of these lines 45 are connected to a common supply line 47 shown in FIG. 1. This supply line is connected to a source of supply of air under pressure, such as the air tanks 48 carried on the front end of the chassis frame 10. These tanks are provided with inlet lines 49 which may be coupled to and uncoupled from the air system of the truck tractor. Obviously, each of the bodies 12 can be independently dumped by operation of the respective control valve 46.

It will be apparent that may invention provides for a dump vehicle including a dump body pivotally mounted on the vehicle chassis frame for movement between a horizontal normal position and an inclined dumping position using an air bag assembly as a means of power to raise and lower the dump body. The dump body is so pivoted and the air bag assembly is so designed and so disposed between the body and the chassis frame that maximum lift is obtained with a minimum stroke of the bags. Also, unnecessary twisting and distortion of the superimposed bags of the assembly is prevented by the plate connected between the bags and the pivot axis of the dump body.

Having thus described my invention, what is claimed is:

1. A dump vehicle comprising a chassis having a frame, a dump body pivoted to said frame at a pivot axis for movement from a normal non-dumping position to an elevated inclined dumping position, and means for moving said body between said positions, said means comprising an air-bag assembly connected between the frame and said dump body at a location spaced from said pivot axis, said assembly comprising air-bags in superimposed end-to-end relationship, and means for controlling flow of air to and from said air-bags of the assembly, said body having a dump end, said pivot axis being spaced inwardly of the dump end, and said air-bag assembly being located inwardly of but closely adjacent said pivot axis, said air-bag assembly being supported on the frame in normally upright position with the lower end of the lowermost bag connected to the frame, said dump body having a bottom, said bag assembly having the upper end of its upper bag connected to the bottom, a stabilizer plate connected between adjacent ends of the superimposed bags and pivoted to said frame to control tilting of the air-bag assembly during raising and lowering of the dump body, means for hinging the plate at said pivot axis, said plate being fixed between said adjacent ends of the bags and having a passageway therethrough connecting said ends.

2. A vehicle according to claim 1 in which the chassis frame includes a pair of longitudinally extending parallel support beams, said dump body being disposed transversely of said beams, said pivot axis being provided by a hinge structure connected to the bottom of the dump body adjacent a tailgate discharge end, said hinge structure being supported by one of the beams, said air bag assembly being supported in the space between the beams and being anchored therein, said plate being fixed between said adjacent ends of the bags and being hinged at said dump body hinge axis.

3. A vehicle according to claim 2 in which the hinge is connected to the dump body at a point spaced inwardly of its discharge end.

4. A vehicle according to claim 3 in which the dump body is provided with a tailgate having an auxiliary gate thereon.

5. A vehicle according to claim 3 in which a plurality of the dump bodies are provided at spaced intervals along said beams and are all pivoted thereto for dumping at the same side of the frame, and means for selectively controlling the respective air bag assemblies of the plurality of dump bodies.

6. A dump vehicle comprising a chassis having a frame, a dump body pivoted to said frame at a pivot axis for movement from a normal non-dumping position to an elevated inclined dumping position, and means for moving said body between said positions, said means comprising an air-bag assembly connected between the frame and said dump body at a location spaced from said pivot axis, said assembly being supported on the frame in normally upright position with the lower end of the lowermost bag connected to the frame, said dump body having a bottom, said bag assembly having the upper end of its upper bag connected to the bottom means for controlling flow of air to and from said air-bags of the assembly, and a rigid stabilizer lever arm connected to the bag assembly and pivoted to said frame at a common axis with said dump body pivot axis so as to confine movement of the air-bags, during expansion to lift the dump body, to an arcuate path so that the axis of the air-bag assembly will be substantially arcuate and concentric with said pivot axis.

7. A dump vehicle according to claim 6 in which said stabilizer arm is in the form of a plate connected between adjacent ends of the superimposed bags, and means for hinging the plate to said frame at said common pivot axis.

8. A vehicle according to claim 7 in which the chassis frame includes a pair of longitudinally extending parallel support beams, said dump body being disposed transversely of said beams, said dump body pivot axis being provided by a hinge structure connected to the bottom of the dump body adjacent a discharge end, said hinge structure for the dump body and the hinging means for the plate being supported co-axially by one of the beams, said air-bag assembly being supported in the space between the beams and being anchored therein.

* * * * *

UNITED STATES PATENT OFFICE
CERTIFICATE OF CORRECTION

Patent No. 3,784,255  Dated January 8, 1974

Inventor(s) Edmund G. Smock

It is certified that error appears in the above-identified patent and that said Letters Patent are hereby corrected as shown below:

Column 3, line 45, cancel "maximum" and insert therefor --minimum--.

Signed and sealed this 1st day of October 1974.

(SEAL)
Attest:

McCOY M. GIBSON JR.
Attesting Officer

C. MARSHALL DANN
Commissioner of Patents